United States Patent Office 3,018,163
Patented Jan. 23, 1962

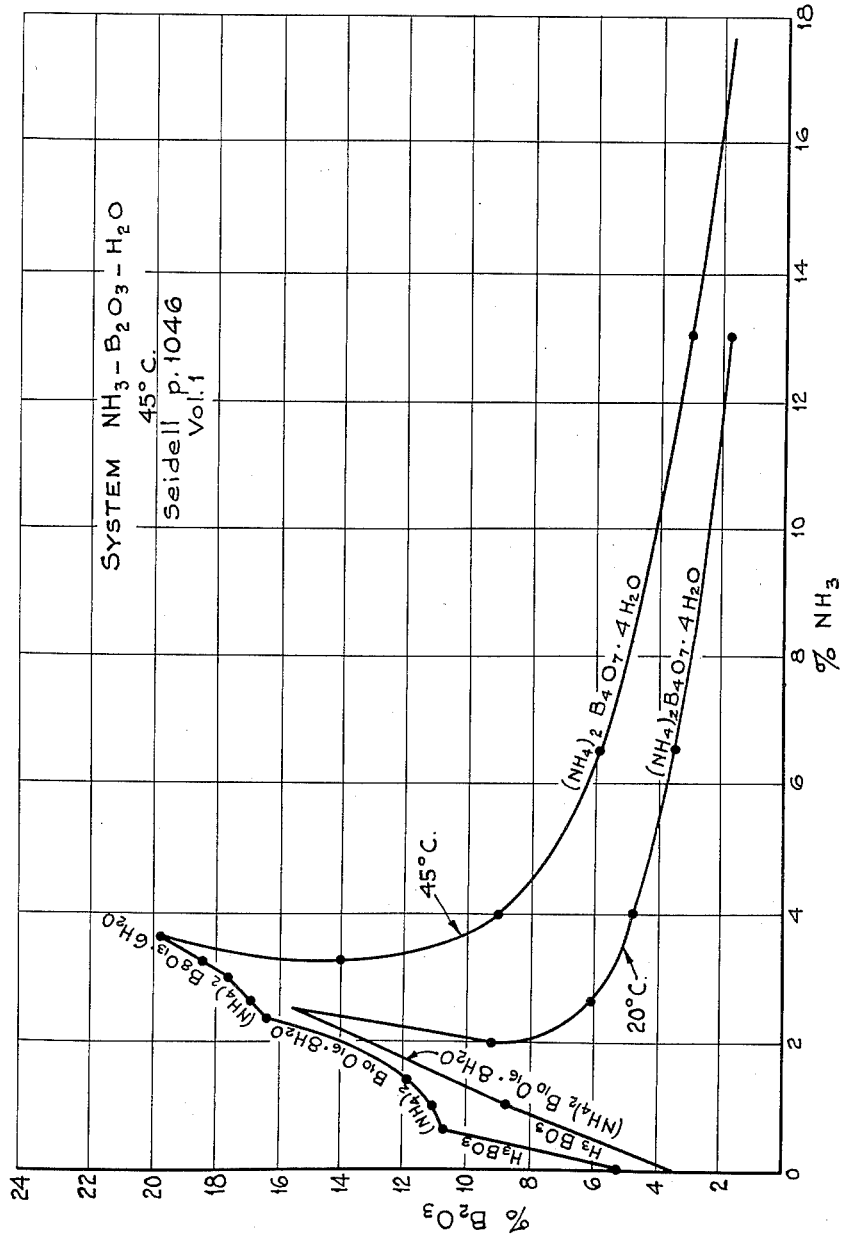

3,018,163
RECOVERY OF BORATE VALUES FROM
CALCIUM BORATE ORES
Frank H. May and Vladimir V. Levasheff, Whittier,
Calif., assignors to American Potash & Chemical Corporation, a corporation of Delaware
Filed Aug. 1, 1958, Ser. No. 752,517
4 Claims. (Cl. 23—59)

This invention relates to the recovery of boron in a useful form from a calcium borate ore.

With the rapidly growing demand for various boron products, the fairly extensive deposits of calcium borate ores represent an important source of potential raw material. A search of the literature fails to reveal an economical method for processing calcium borate ores to produce marketable boron chemicals competitive to existing production from sodium borate ores. The conventional methods for refining calcium borate ores entail the use of mineral acids or acid gases such as sulfur dioxide or carbon dioxide under pressure for recovery of the boron values as boric acid or the use of sodium carbonate to convert and recover the values as sodium borates. The acid methods of recovery are uneconomical due to the high alkaline impurity content of the ores and the low boron to alkalinity ratio of the calcium borate minerals. The sodium carbonate method requires operation under pressure and is economically unattractive because of the added raw materials and processing costs.

We have developed a simple and economical process for treating calcium borate ores which does not involve the use of acids or expensive raw materials. Our process is based upon the direct extraction of the boron value from the ore at moderate temperatures and atmospheric pressure with an aqueous solution of ammonia and carbon dioxide, a useful reagent being ammonium carbonate. The extraction forms ammonium borate in solution and solid calcium carbonate. Essentially complete recovery of the borate values can be achieved from colemanite by this method and the process can be operated to yield directly a solution which can be cooled to produce a crop of solid ammonium borate. The filtrate can be recycled, with further addition of ammonia and carbon dioxide, to the ore leaching step to establish a completely cyclic process. Both the ammonia and carbon dioxide can be recovered and recycled through the process by calcining the respective ammonium borate and calcium carbonate products to separate ammonia and carbon dioxide.

Ammonium borate is a marketable product as such, while the calcined product can be sold as boric oxide or converted to boric acid. Ammonium borate can be easily converted to sodium, potassium, or other alkali metal borates by solubility methods through reaction with the respective chlorides or other available salts. An ammonium salt is a by-product of such an operation or the ammonia can be recovered by displacement with the lime from the calcined calcium carbonate by-product. If potassium borates are produced from potassium chloride as a raw material, for example, ammonium chloride or calcium chloride is the by-product of the process.

The following examples demonstrate the ease and effectiveness of the extraction of borate values from borate ores with an ammonium carbonate solution.

Debelly colemanite ore analyzing 74.3%

$$Ca_2B_6O_{11} \cdot 5H_2O$$

(10.3% $CaCO_3$) and 15.4% insolubles (26.82% CaO, 36.55% $B_2O_3$, 7.25% $CO_2$) was used in the following runs. This ore was ground to pass 50 mesh screen.

*Example 1.*—The colemanite ore was digested in a dilute ammonium carbonate solution to determine the rate of extraction of boron values at approximately 55° C. The leaching operation was carried out at atmospheric pressure, in a three-necked flask with a motor-driven agitator, a water-cooled reflux condenser and a thermometer. 770 grams of colemanite ore were treated with 2800 grams of water containing 370 grams of ammonium carbonate. The 770 grams of ore contained 205.5 grams of CaO, 281.4 grams of $B_2O_3$, and 55.8 grams of $CO_2$.

On the basis of the equation

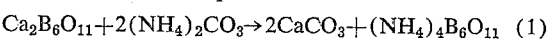

$$Ca_2B_6O_{11} + 2(NH_4)_2CO_3 \rightarrow 2CaCO_3 + (NH_4)_4B_6O_{11} \quad (1)$$

the amount of $CO_2$ and ammonia provided by the ammonium carbonate solution were respectively approximately 95% in excess of the $CO_2$ requirement and about 77% in excess of the $NH_3$ requirement.

In this run, the ore was leached with agitation for two and a half hours at 55° C. The reaction slurry was then allowed to stand for some sixty hours at room temperature. It was then reheated with agitation and leached at 55° C. for an additional hour and then filtered; four samples of the filtrate were obtained at definite time intervals, as shown in TABLE I. These samples were analyzed for boron content. The leaching rate data obtained are summarized in Table I:

TABLE I

| Sample | Time (Min.) | Percent extracted of total available boric oxide |
|---|---|---|
| 1 | 10 | 24.9 |
| 2 | 40 | 47.1 |
| 3 | 100 | 64.4 |
| 4 | 160 | 70.1 |

At the end of the additional leaching period, the reaction slurry was filtered on a Büchner funnel. The resulting solids were washed with hot water and air dried. A 510-gram quantity of dry residue was obtained. Analysis for boron indicated that the residue solids contained 7.0% boric oxide. The over-all extraction efficiency was calculated from the weight and analysis of residue solids. This was found to be 87.3%.

From a material balance, the approximate composition of extracted liquor was:

|  | Percent |
|---|---|
| $NH_3$ | 3.4 |
| $CO_2$ | 3.6 |
| $B_3O_3$ | 7.5 |
| $H_2O$ | 85.5 |

*Example 2.*—In this run, the ratios of reactants were adjusted to minimize the excess of ammonium carbonate and to yield a higher borate concentration in the leach liquor. To this end, 646 grams of colemanite ore, containing 173.3 grams of CaO, 236.1 grams of $B_2O_3$ and 46.8 grams of $CO_2$ were treated with 186.2 grams of an ammonium carbonate solution containing 55.9 grams of $NH_3$ and 104.6 grams of $CO_2$, in 1254 grams of water.

This extraction was carried out at about 80–83° C. for three hours. Samples of filtrate were obtained at definite time intervals and analyzed for boron content. The leaching rate data are summarized in Table II:

TABLE II

*Leaching of uncalcined colemanite ore with ammonium carbonate solution at 80–83° C.*

| Sample | Time (Min.) | Percent extracted of total available boric oxide |
|---|---|---|
| 1 | 20 | 39.9 |
| 2 | 60 | 60.9 |
| 3 | 120 | 69.5 |
| 4 | 180 | 71.9 |

At the end of the run, the hot reaction slurry was filtered to separate the residue solids. These were washed and then air dried. A 465-gram quantity of solids was found by analysis to contain 10.08% boric oxide. The over-all extraction efficiency, as calculated from the weight and analysis of residue solids, was 80.1%.

*Example 3.*—The colemanite ore was precalcined to remove organic matter at about 700° C. before being extracted. The calcined material had the following analysis:

| | Percent |
|---|---|
| CaO | 37.7 |
| $B_2O_3$ | 42.9 |
| $CO_2$ | 4.1 |

In this run, 290 grams of calcined ore, containing 109.3 grams CaO, 124.4 grams $B_2O_3$ and 11.9 grams $CO_2$, were leached at about 50° C. for sixteen hours with a dilute solution of ammonium carbonate (180 grams ammonium carbonate representing 54.0 grams $NH_3$ and 101.2 grams $CO_2$ in 5270 grams of water).

At the end of the leaching period, the reaction slurry was treated as previously described. A 220-gram quantity of air dried residue solids were found by analysis to contain 2.89% boric oxide.

Extraction efficiency was again calculated from the weight and analysis of residue solids and was found to be 94.9%. From a material balance, the approximate composition of the extracted liquor was calculated as follows:

| | Percent |
|---|---|
| $NH_3$ | 1.0 |
| $B_2O_3$ | 2.2 |
| $CO_2$ | 0.6 |
| $H_2O$ | 96.2 |

*Example 4.*—The colemanite ore was precalcined at about 600° C. before being extracted to remove organic matter. The calcined ore had the following analysis:

| | Percent |
|---|---|
| CaO | 35.9 |
| $B_2O_3$ | 39.5 |
| $CO_2$ | 8.1 |

For this test, 570 grams of calcined colemanite (containing 204.6 grams CaO, 225.2 grams $B_2O_3$ and 46.2 grams $CO_2$) were treated with 334 grams of ammonium carbonate (100.2 grams $NH_3$ and 187.7 grams $CO_2$) in 1270 grams of water.

The leaching operation was carried out at about an 80° C. temperature. Samples of filtrate were obtained at definite time intervals and analyzed for boron content. The leaching rate data thus obtained are summarized in Table III.

TABLE III

*Leaching of calcined colemanite ore with ammonium carbonate solution at 80° C.*

| Sample | Time (Min.) | Percent of total available Boric Oxide |
|---|---|---|
| 1 | 30 | 89.4 |
| 2 | 60 | 94.3 |
| 3 | 90 | 95.8 |
| 4 | 150 | 96.5 |
| 5 | 270 | 96.9 |

At the end of the leaching test, the residue solids were separated by the previously described procedure. These solids were analyzed to contain 0.52% boric oxide, representing 98.9% over-all extraction efficiency.

The hot filtrate, as obtained in separation of residue solids from the reaction slurry, was found by analysis to have the following composition:

| | Percent |
|---|---|
| $NH_3$ | 4.9 |
| $B_2O_3$ | 13.8 |
| $CO_2$ | 2.6 |
| $H_2O$ | 78.7 |

This filtrate was cooled to room temperature overnight. The crop of solids which crystallized on cooling was filtered and air dried. These solids were found by analysis to be 99.1% ammonium tetraborate tetrahydrate.

From a material balance, the approximate composition of the extracted liquor was as follows:

| | Percent |
|---|---|
| $NH_3$ | 6.0 |
| $B_2O_3$ | 13.3 |
| $CO_2$ | 4.5 |
| $H_2O$ | 76.2 |

These values indicate some loss of $CO_2$ and $NH_3$ during the leaching and filtering operations.

The exact ratio of ammonia to carbon dioxide in the system is of minor importance except as it affects the $B_2O_3$ leaching rate, recovery efficiency ($CaCO_3$ solubility), and low temperature solubility of the ammonium borate product. As demonstrated by Examples 1–4, the exact ratios of ammonia to carbon dioxide in the leach solution is not critical and can vary between the ratios of 2 to 1 [$(NH_4)_2CO_3$] and 1 to 1 ($NH_4HCO_3$) without appreciable loss of efficiency.

For practical reasons, the ammonia to $CO_2$ ratio can be controlled to minimize the partial pressures at the higher leaching temperatures and possibly to allow for optimum borate solubility. Also, it may be desirable to control the ammonia concentration to crystallize a more acid borate than the tetraborate from the cooled leach liquor. The concentrated leach solution can be altered in ammonia concentration before cooling by boiling off or adding ammonia to obtain the desired solid phase and to establish the maximum yield per cycle for a given volume of extracting solution. The process is very versatile in this respect. In the drawing which accompanies and forms a part of this specification, we have shown the various solid phases which exist at 20° and at 45° C. in relation to the $B_2O_3$ and $NH_3$ values.

We have tested ammonia solutions and found them ineffective for leaching the calcium borate ores. For example, 16 hours leaching at 50–60° C. with dilute ammonium hydroxide resulted in a less than 2% extraction of the borate values.

The use of ammonium carbonate has the added advantage of permitting recycle of both the ammonia and the equivalent acid ($CO_2$) values, which is important from an economical standpoint. In actual operation, the ratios and concentrations of $CO_2$ and $NH_3$ can be varied to obtain an optimum leaching from a given ore and yield a direct crop of crystallized borate product for the most effective heating and cooling cycle.

We claim:

1. A process for recovering boron values from calcium borate ore comprising: leaching said ore with a hot aqueous solution of ammonia and a hot aqueous solution of carbon dioxide, said hot aqueous solutions being maintained at a temperature less than 83° C., the ratio of ammonia to carbon dioxide falling within the range 2:1 to 1:1 to form ammonium borate in solution and solid calcium carbonate; separating the liquor so formed from said solid calcium carbonate and said ore; and cooling said liquor to precipitate said ammonium borate.

2. The process of claim 1 wherein the said precipitated ammonium borate is calcined to drive off ammonia therefrom and said ammonia is recycled in the said system.

3. The process of claim 1 wherein the said ammonium borate is calcined to drive off ammonia therefrom and the said ammonia is recycled in the said system and wherein the said solid calcium carbonate and the said ore are calcined to drive off the carbon dioxide therefrom and the carbon dioxide is recycled in the said system.

4. A process for recovering boron values from calcium borate ore comprising: leaching said ore with a hot aqueous solution of ammonium carbonate, said hot aqueous solution being maintained at a temperature of less than 83° C., the ratio of ammonia to carbon dioxide falling within the range 2:1 to 1:1, to form ammonium borate in solution and solid calcium carbonate; separating the liquor so formed from said solid calcium carbonate and said ore; and cooling said liquor to precipitate said ammonium borate.

References Cited in the file of this patent

UNITED STATES PATENTS

| | | |
|---|---|---|
| 1,046,594 | Hoyler et al. | Dec. 10, 1912 |
| 2,867,502 | Stange et al. | Jan. 6, 1959 |

OTHER REFERENCES

Mellor: A Comprehensive Treatise on Inorganic and Theoretical Chemistry, volume 5 (1924), pages 65 and 80, and volume 3, (1923), page 653.